(12) United States Patent
Parham et al.

(10) Patent No.: US 8,250,220 B2
(45) Date of Patent: Aug. 21, 2012

(54) GENERALIZED PROXIMITY SERVICE

(75) Inventors: Jeffrey B. Parham, Redmond, WA (US); Levon A. Esibov, Sammamish, WA (US); Nicholas J. Harvey, Redmond, WA (US); William B. Lees, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 0 days.

(21) Appl. No.: 13/358,233

(22) Filed: Jan. 25, 2012

(65) Prior Publication Data

US 2012/0124223 A1    May 17, 2012

Related U.S. Application Data

(63) Continuation of application No. 10/448,903, filed on May 30, 2003, now Pat. No. 8,145,699.

(51) Int. Cl.
G06F 15/16 (2006.01)

(52) U.S. Cl. ........ 709/227; 709/202; 709/203; 709/217; 709/238

(58) Field of Classification Search .................. 709/202, 709/203, 217, 227, 238
See application file for complete search history.

(56) References Cited

U.S. PATENT DOCUMENTS

| | | | |
|---|---|---|---|
| 6,112,248 A | 8/2000 | Maciel | |
| 6,522,880 B1 | 2/2003 | Verma | |
| 6,785,704 B1 | 8/2004 | McCanne | |
| 6,892,218 B2 | 5/2005 | Heddaya | |
| 7,020,719 B1 | 3/2006 | Grove | |
| 2002/0156893 A1 | 10/2002 | Pouyoul | |
| 2004/0054807 A1 | 3/2004 | Harvey | |

OTHER PUBLICATIONS

Barbeau, M., "Service Discovery in a Mobil Agent API Using SLP" Global Telecommunication Conference GLOBECOM'99, vol. 1 of 5, vol. 1a, pp. 391-395 (Dec. 1999).
Friday, A., et al., "Supporting Service Discovery, Querying and Interaction in Ubiquitous Computing Environments", proceedings Second ACM International Workshop on Data Engineering for Wireless and Mobile Access, MobiDE 2001, pp. 7-13.
Haas, R., et al., "PNNI Augmented Routing (PAR) and Proxy-PAR", Computer Networks, The International Journal of Computer and Telecommunications Networking, vol. 34, No. 3, pp. 399-418 (Sep. 2000).
Handorean, R., et al., "Service Provision in Ad Hoc Networks", Coordination Models and Languages, 5th International Conference, Coordination 2002, York, UK, pp. 207-219, (Apr. 2002).
U.S. Appl. No. 10/448,903, filed Nov. 8, 2006, Office Action.
U.S. Appl. No. 10/448,903, filed Feb. 21, 2007, Office Action.
U.S. Appl. No. 10/448,903, filed Jul. 24, 2007, Office Action.
U.S. Appl. No. 10/448,903, filed Nov. 8, 2007, Office Action.
U.S. Appl. No. 10/448,903, filed Mar. 19, 2008, Office Action.
U.S. Appl. No. 10/448,903, filed Sep. 2, 2008, Office Action.
U.S. Appl. No. 10/448,903, filed Mar. 2, 2010, Office Action.
U.S. Appl. No. 10/448,903, filed Aug. 16, 2010, Office Action.
U.S. Appl. No. 10/448,903, filed Apr. 13, 2011, Office Action.
U.S. Appl. No. 10/448,903, filed Sep. 27, 2011, Notice of Allowance.

*Primary Examiner* — Adnan Mirza
(74) *Attorney, Agent, or Firm* — Workman Nydegger

(57) ABSTRACT

A system and method for identifying network endpoints that provide a service of interest orders endpoints according to their network proximity to a requesting client. The requesting client may then contact the closest available providing endpoint, thus increasing the efficiency of usage of network resources while decreasing latency and enhancing reliability. In an embodiment of the invention, when a connection to the nearest providing endpoint cannot be established, a mechanism for locating a next-closest alternative endpoint is provided.

10 Claims, 9 Drawing Sheets

GENERALIZED PROXIMITY SERVICE

CROSS-REFERENCE TO RELATED APPLICATIONS

This application is a continuation of U.S. patent application Ser. No. 10/448,903, filed May 30, 2003, which is hereby incorporated by reference.

FIELD OF THE INVENTION

This invention relates generally to network service discovery and, more particularly, relates to a system and method for network service discovery using endpoint network locality.

BACKGROUND

Computer networks have become commonplace and are used to create value and increase productivity and customer satisfaction in many business enterprises, and are also productively used in many private settings. The increase in network usage has led to an abundance of remote storage mechanisms. That is, data and/or services needed at a particular computer or site may be stored at and retrieved from a remote location. For example, a domain name server acts a remote storage location of IP addresses for a client machine. Generally, servers, directories, databases and other repositories provide remote storage facilities that may be accessed over a network connection for any number of reasons.

Typically, data and services that may be widely and frequently accessed by different machines in a dispersed network are replicated over the network. That is, for example, a service is identically duplicated to a widely distributed plurality of repositories accessible to clients via the network. A few of the primary benefits provided by data replication are decreased response time for most requests, decreased network utilization per request on average, generally increased capacity and generally increased reliability.

With respect to decreasing response time, replication increases the probability that a client machine will be able to access a nearby repository, and thus, especially when large quantities of data are involved, the response time to transmit the data from the repository to the requesting client may be reduced. Similarly, with respect to decreased network utilization, if clients resort to nearby repositories for the information they need, then the sum of network traffic relative to all replicas is less than would be the case if a single repository were utilized instead of replicas. The aforementioned general increase in capacity due to replication comes about because of the ability of multiple replicas to serve multiple clients at the same time without impacting each other. Finally, increased reliability is generally realized in a replicated system due to the ability of each site or replica to serve clients whose preferred replica or site is not functioning.

Replication does, however, bring with it certain costs above and beyond the cost of replication itself. For example, a client machine is not inherently aware of which replica or site it should use to access the required data or service (hereinafter collectively referred to as "service"). Typically, in order to reap the benefits of decreased response time and decreased network utilization, client machines need to access the closest available replica. Usually this requires management or administrative personnel to manually configure each client. Not only does this increase management costs and the number of opportunities for error, but in addition, companies and institutions often are reluctant to deploy new replicas because such could require a manual reconfiguration of some or all of the relevant clients.

BRIEF SUMMARY OF THE INVENTION

In various embodiments, the invention provides a mechanism for assuring that a requesting client in a distributed network is automatically informed of the closest available endpoint for accessing a particular service. In particular, according to an embodiment of the invention a nearest endpoint locator first determines the network location of the requesting client. Subsequently, the nearest endpoint locator identifies network endpoints for accessing the service requested by the client. For each such endpoint, the nearest endpoint locator determines the network location of the endpoint, and then consults an endpoint repository to determine the network proximity of the endpoint to the requesting client.

After determining how close each endpoint is to the requesting client, the nearest endpoint locator sorts all or some of the endpoints in order of their proximity to the requesting client. After the sorted list is returned to the client, the client is then able to contact the nearest endpoint currently available to access the requested service. When a listed endpoint is unavailable, the client is able to identify the next closest endpoint by simply choosing the next endpoint in the ordered listing.

Additional features and advantages of the invention will be made apparent from the following detailed description of illustrative embodiments which proceeds with reference to the accompanying figures.

BRIEF DESCRIPTION OF THE DRAWINGS

While the appended claims set forth the features of the present invention with particularity, the invention, together with its objects and advantages, may be best understood from the following detailed description taken in conjunction with the accompanying drawings of which:

DETAILED DESCRIPTION

Figure 1:
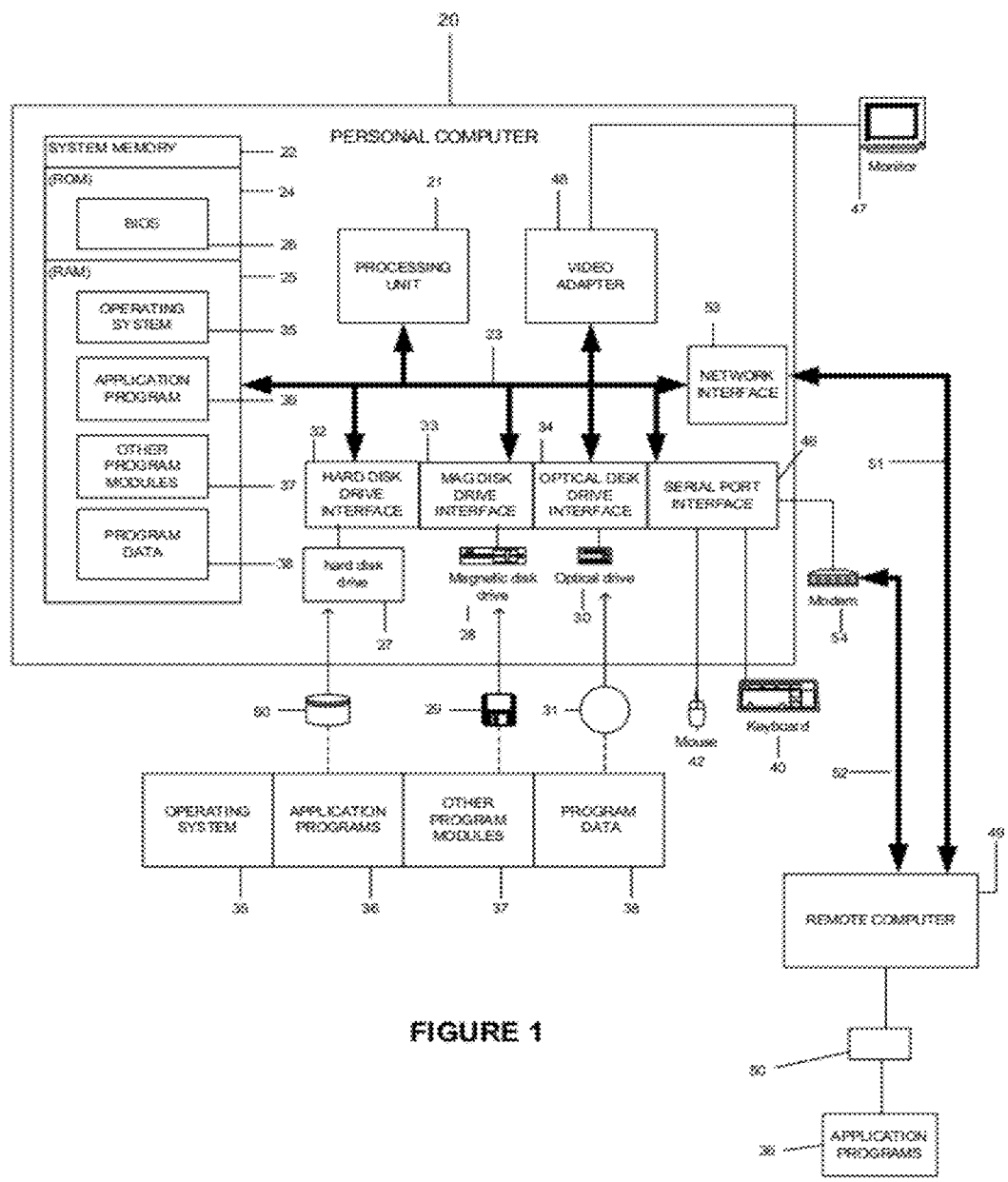
FIG. 1 is a block diagram generally illustrating an exemplary device architecture in which embodiments of the present invention may be implemented.

Turning to the drawings, wherein like reference numerals refer to like elements, the invention is illustrated as being implemented in a suitable computing environment. Although not required, the invention will be described in the general context of computer-executable instructions, such as program modules, being executed by a computer. Generally, program modules include routines, programs, objects, components, data structures, etc. that perform particular tasks or implement particular abstract data types. Moreover, those skilled in the art will appreciate that the invention may be practiced with other computer system configurations, including hand-held devices, multi-processor systems, microprocessor-based or programmable consumer electronics, network PCs, minicomputers, mainframe computers, and the like. The invention may be practiced in distributed computing environments where tasks are performed by remote processing devices that are linked through a communications network. In a distributed computing environment, program modules may be located in both local and remote memory storage devices.

This description begins with a description of a general-purpose computing device that may be used in an exemplary system for implementing the invention, after which the invention will be described in greater detail with reference to FIG. 2 and subsequent Figures. Turning now to FIG. 1, a general purpose computing device is shown in the form of a conventional computer 20, including a processing unit 21, a system memory 22, and a system bus 23 that couples various system components including the system memory to the processing unit 21. The system bus 23 may be any of several types of bus structures including a memory bus or memory controller, a peripheral bus, and a local bus using any of a variety of bus architectures. The system memory includes read only memory (ROM) 24 and random access memory (RAM) 25. A basic input/output system (BIOS) 26, containing the basic routines that help to transfer information between elements within the computer 20, such as during start-up, is stored in ROM 24. The computer 20 further includes a hard disk drive 27 for reading from and writing to a hard disk 60, a magnetic disk drive 28 for reading from or writing to a removable magnetic disk 29, and an optical disk drive 30 for reading from or writing to a removable optical disk 31 such as a CD ROM or other optical media.

The hard disk drive 27, magnetic disk drive 28, and optical disk drive 30 are connected to the system bus 23 by a hard disk drive interface 32, a magnetic disk drive interface 33, and an optical disk drive interface 34, respectively. The drives and their associated computer-readable media provide nonvolatile storage of computer readable instructions, data structures, program modules and other data for the computer 20. Although the exemplary environment described herein employs a hard disk 60, a removable magnetic disk 29, and a removable optical disk 31, it will be appreciated by those skilled in the art that other types of computer readable media which can store data that is accessible by a computer, such as magnetic cassettes, flash memory cards, digital video disks, Bernoulli cartridges, random access memories, read only memories, storage area networks, and the like may also be used in the exemplary operating environment.

A number of program modules may be stored on the hard disk 60, magnetic disk 29, optical disk 31, ROM 24 or RAM 25, including an operating system 35, one or more applications programs 36, other program modules 37, and program data 38. A user may enter commands and information into the computer 20 through input devices such as a keyboard 40 and a pointing device 42. Other input devices (not shown) may include a microphone, joystick, game pad, satellite dish, scanner, or the like. These and other input devices are often connected to the processing unit 21 through a serial port interface 46 that is coupled to the system bus, but may be connected by other interfaces, such as a parallel port, game port or a universal serial bus (USB) or a network interface card. A monitor 47 or other type of display device is also connected to the system bus 23 via an interface, such as a video adapter 48. In addition to the monitor, computers typically include other peripheral output devices, not shown, such as speakers and printers.

The computer 20 preferably operates in a networked environment using logical connections to one or more remote computers, such as a remote computer 49. The remote computer 49 may be another personal computer, a server, a router, a network PC, a peer device or other common network node, and typically includes many or all of the elements described above relative to the computer 20, although only a memory storage device 50 has been illustrated in FIG. 1. Several examples of network types and remote computer types will be discussed additionally with reference to FIG. 2 below. The logical connections depicted in FIG. 1 include a local area network (LAN) 51 and a wide area network (WAN) 52. Such networking environments are commonplace in offices, enterprise-wide computer networks, intranets and the Internet.

When used in a LAN networking environment, the computer 20 is connected to the local network 51 through a network interface or adapter 53. When used in a WAN networking environment, the computer 20 typically includes a modem 54 or other means for establishing communications over the WAN 52. The modem 54, which may be internal or external, is connected to the system bus 23 via the serial port interface 46. Program modules depicted relative to the computer 20, or portions thereof, may be stored in the remote memory storage device if such is present. It will be appreciated that the network connections shown are exemplary and other means of establishing a communications link between the computers may be used.

In the description that follows, the invention will be described with reference to acts and symbolic representations of operations that are performed by one or more computers, unless indicated otherwise. As such, it will be understood that such acts and operations, which are at times referred to as being computer-executed, include the manipulation by the processing unit of the computer of electrical signals representing data in a structured form. This manipulation transforms the data or maintains it at locations in the memory system of the computer, which reconfigures or otherwise alters the operation of the computer in a manner well understood by those skilled in the art. The data structures where data is maintained are physical locations of the memory that have particular properties defined by the format of the data. However, while the invention is being described in the foregoing context, it is not meant to be limiting as those of skill in the art will appreciate that many of the acts and operations described hereinafter may also be implemented in hardware.

Prior to a further detailed discussion of embodiments of the invention, it may be useful to more expressly define and discuss a number of terms and concepts for the convenience of the reader. The concepts and terms to be discussed include the concept of network well-connectedness, as well as the terms and phrases subnet, site, site repository, network location, network proximity, endpoint, service repository, and nearest endpoint locator.

Two or more computers that can intercommunicate via one or more network connections with high bandwidth, low latency, and high reliability, and where the incremental cost of communication is low are said to be "well-connected." An example of well-connected computers is a group of two or more computers connected via a local area network. On the other hand, two computers are not well-connected as that term is used herein when the sole or fastest connection between them is a dial-up connection to the Internet.

In the first example, the computers can communicate at any time over the local network with high bandwidth and reliability, as well as low latency, and the incremental cost of communication is low in that there is no extensive set-up or delay entailed to communicate after a substantial period of silence. However, in the latter case the dial-up connection causes the two computers to lack well-connectedness since there is a substantial incremental cost of communication, e.g. the dial-up connection must be reestablished to initiate communications after a substantial period of silence, and in addition, a dial-up connection is typically associated with relatively low bandwidth and reliability and high latency.

Moving on to a discussion of other terms and phrases, the term "subnet" as used herein refers to a logical range of network addresses, in the same manner as that term is generally understood by those of skill in the art. The term "site" refers to a collection of network addresses, such as comprising a set of one or more subnets, wherein any computer with a network address within this collection is well-connected to any other computer whose network address is also in the collection. A "site repository" as that term is used herein is a repository holding information about one or subnets, and/or one or more sites, and the interconnections between one or more sites and/or one or more subnets. An exemplary technology for implementing a site repository is the Active Directory® directory service produced by Microsoft Corporation of Redmond Wash., although those of skill in the art will appreciate the applicability within embodiments of the invention of many other suitable data storage and access technologies as well.

The phrase "network location" as used herein refers to the extent of a network containing a particular machine, and may refer to networks at various levels of granularity including a network address, a network subnet, a network site, and so on. The phrase "network proximity" refers herein to a measure of the nearness of two computers to each other in terms of network distance. Typically, although not necessarily, the network proximity is a relative value that may be unitless, and that may have meaning only when compared to one or more other network proximities. In an embodiment of the invention, the nearness of two computers or locations to each other is measured by the incremental cost of generating network traffic between them, with a lower cost indicating closer network proximity. Network proximity is derived in an embodiment of the invention from a combination of the network addresses of the relevant computers and the information retained in the site repository, e.g. information about subnets and/or sites, and the interconnections there between.

The term "endpoint" is sometimes used herein to refer to an instance of a particular service. As discussed elsewhere herein, endpoints offering the same service (e.g. DNS, authentication, etc.) may be located at different sites to increase the availability of the service and to generally provide the benefits afforded by replication as discussed above. A related phrase sometimes used herein is the phrase "service repository," which refers to a repository of information regarding services and the endpoints that offer those services. Examples of potential service repositories include LDAP directories and UDDI servers.

Figure 2:
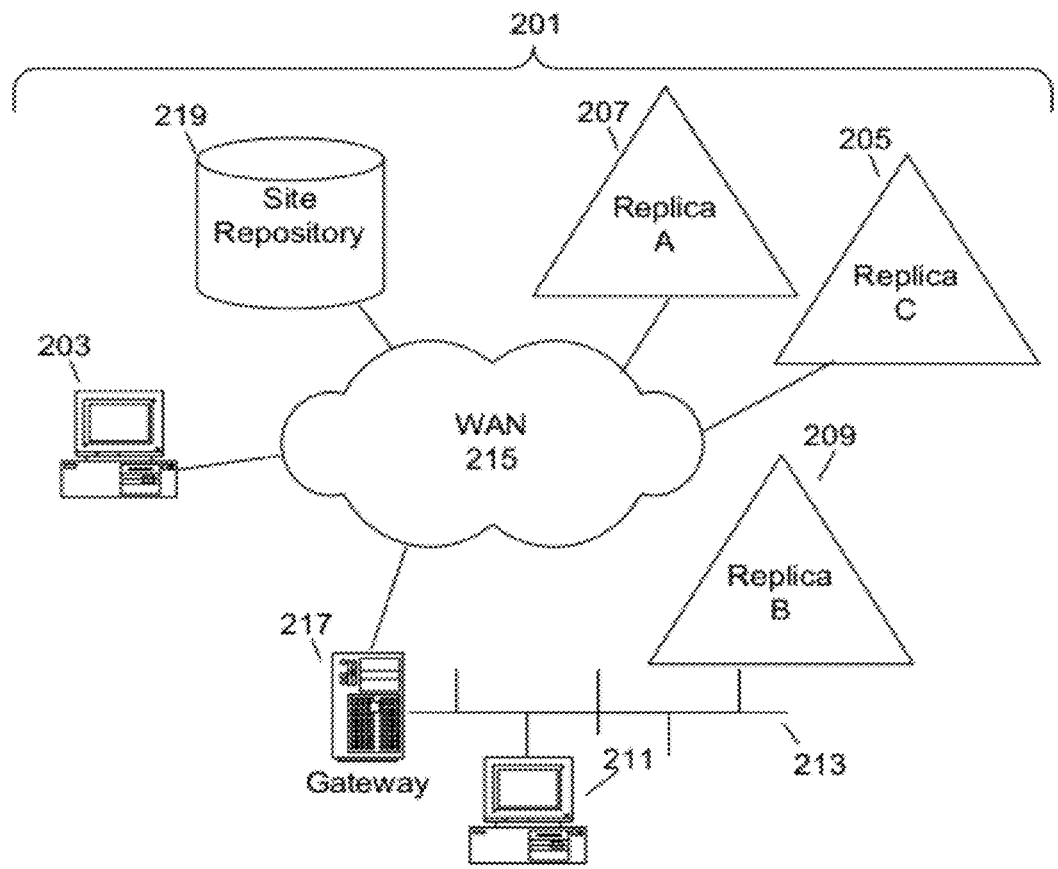
FIG. 2 is a schematic diagram of an operating environment within which an embodiment of the invention may be implemented.

Turning to FIG. 2, an operating environment usable to implement an embodiment of the invention is shown schematically. The environment 201 of FIG. 2 includes a requesting client A 203 that seeks to access a service and/or data provided by a service of interest. The service provided by the service of interest is replicated to various endpoints in the environment 201, including for example Replica A 207, Replica B 209, and Replica C 205. It will be appreciated that replicas such as Replica A 207, Replica B 209, and Replica C 205 typically reside at different respective physical machines in the environment 201. Thus, the number of different network locations from which a particular service is available will typically be equal to the number of replicas.

In greater detail with respect to the environment 201 of FIG. 2, the requesting client A 203, a requesting client B 211, the Replica A 207, the Replica B 209, and the Replica C 205 are interconnected via one or more networks or network connections such as local network 213 and WAN 215. A local network such as network 213 may be connected directly to one or more elements in the environment 201 and indirectly, such as via the WAN 215, to one or more others. In the example environment 201 of FIG. 2, the local network 213 is connected to the WAN 215 via a gateway 217.

Figure 5A:
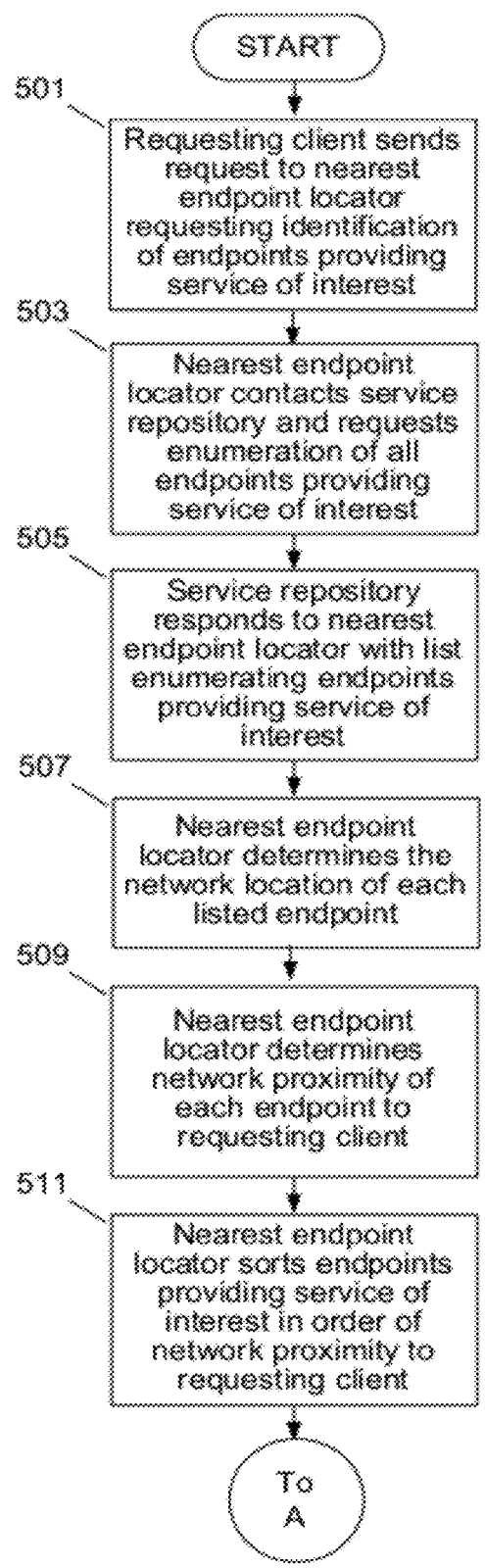
FIG. 5A is a flow chart illustrating steps taken in accordance with an embodiment of the invention to facilitate service location based on network proximity of a providing endpoint to a requesting client.

The WAN may be or comprise the Internet but such is not required. Although local network 213 and WAN 215 are illustrated, it will be understood that any number of network types in addition to or instead of those shown may be used and that the number of networks or network types is not significant, with a lesser or greater number of networks and network types also being usable to implement embodiments of the invention. In addition to the elements described above, a site repository 219 is also included within environment 201. The interaction of the site repository 219 with the other elements of the environment 201 will be described briefly hereinafter, and then in greater detail with respect to FIGS. 5A and 5B.

Briefly, in the illustrated example, the requesting client B 211 can access the site repository 219 via the connection sequence of the network 213, the gateway 217, and the WAN 215. Similarly, the requesting client B 211 can access the service of interest 205 and Replica A 207 via the connection sequence of the network 213, the gateway 217, and the WAN 215, while Replica B 209 can be accessed directly from the requesting client B 211 via local network 213. In contrast, in the example of FIG. 2, requesting client A 203 does not have direct access to any other element of the environment 201, but can access the site repository 219, the service of interest 205 and Replica A 207 via the WAN 215, and can access Replica B 209 via the connection sequence of the WAN 215, the gateway 217, and the network 213. Thus, it is likely that with respect to requesting client B 211, the closest instance of the service and/or data corresponding to the service of interest 205, e.g. the replica having the closest network proximity to requesting client B 211, is Replica B 209. With respect to requesting client A 203, on the other hand, it is likely that the closest instance of the service and/or data corresponding to the service of interest 205 in terms of network proximity is either the service of interest 205 itself or Replica A 207. It is possible that two or more instances of a service of interest are at the same network distance from a particular requesting client, as will be discussed later.

Figure 3:
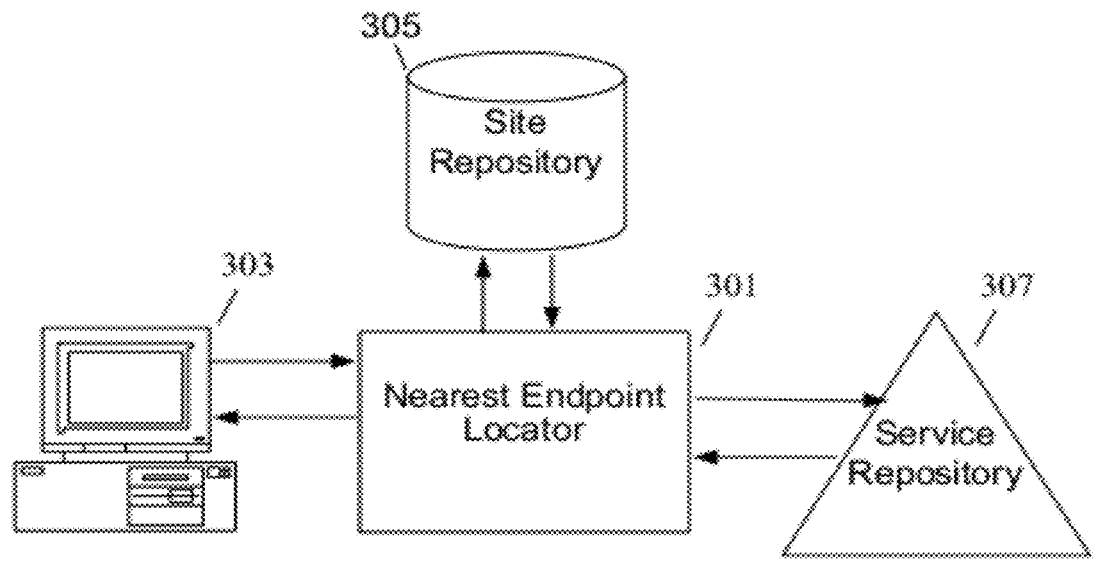
FIG. 3 is a schematic diagram of the nearest endpoint locator and its environment and interfaces according to an embodiment of the invention.
Figure 4A:
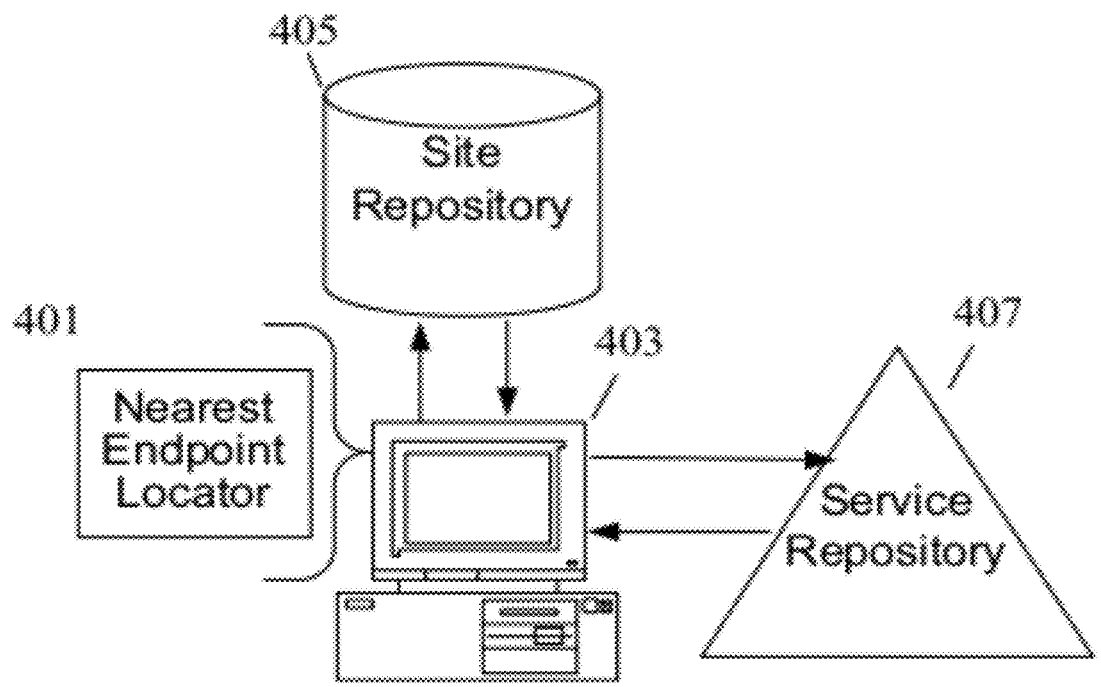
FIG. 4A is a schematic diagram of the nearest endpoint locator and its environment and interfaces according to a further embodiment of the invention.
Figure 4B:
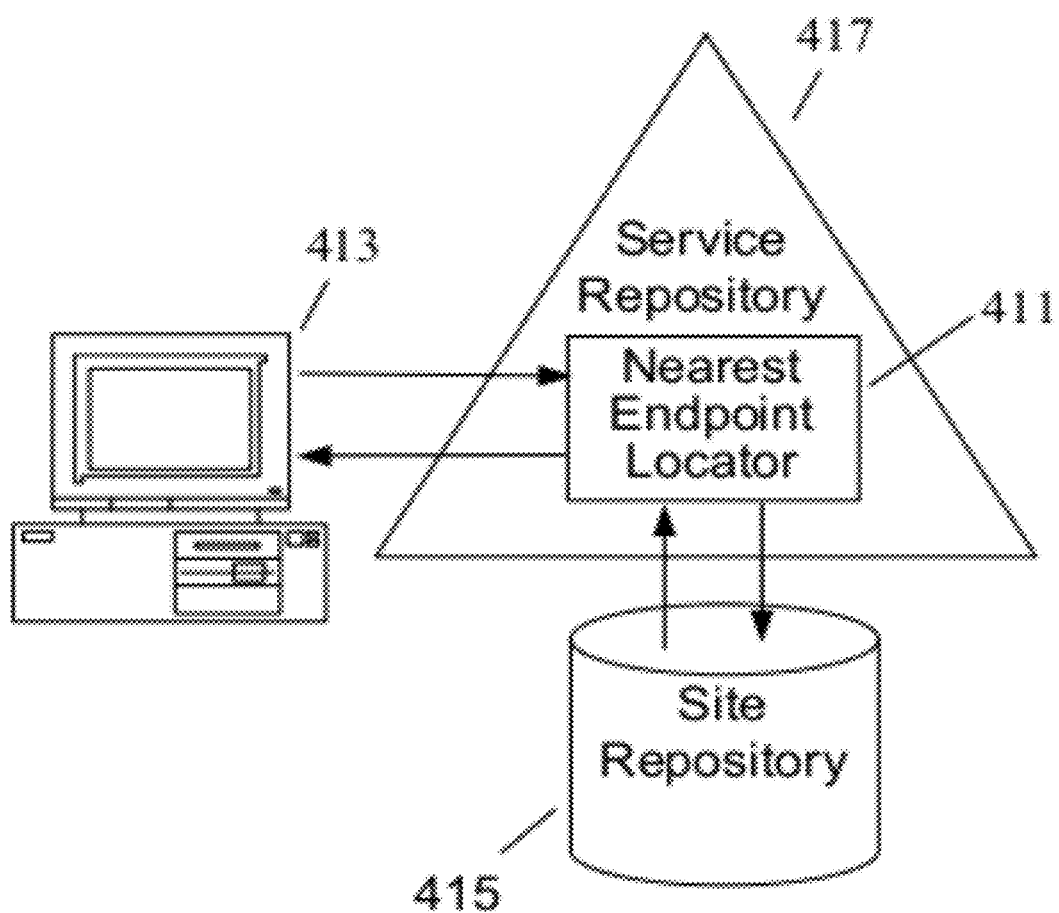
FIG. 4B is a schematic diagram of the nearest endpoint locator and its environment and interfaces according to yet another embodiment of the invention.

In overview, according to certain embodiments of the invention, a nearest endpoint locator, to be described in greater detail with respect to FIG. 3 and FIGS. 4A and 4B, ascertains the network location of the requesting client, for example requesting client A 203. Once the network location of the requesting client has been determined, the nearest endpoint locator identifies all network endpoints that are capable of providing the service or data requested by the client, such as for example Replica A 207, Replica B 209, and the service of interest 205. For each endpoint that is capable of providing the relevant service or data, the nearest endpoint locator determines the network location of the providing endpoint, and consults the site repository 219 to determine the network proximity of the endpoint to the requesting client. Having determined how close each providing endpoint is to the requesting client, the nearest endpoint locator sorts all or some of the providing endpoints in order of their proximity to the requesting client and transmits the sorted list to the requesting client. The requesting client is then able to connect to the nearest providing endpoint to access the service required.

Although the example operating environment 201 is illustrated in some detail, those of skill in the art will appreciate that the exact environment shown is not required for implementation of embodiments of the invention. Thus, although requesting client A 203 and requesting client B 211 are illustrated as ordinary computers, such as the computer 20 described above with respect to FIG. 1, such is not required. In particular, all or some requesting clients may be any other type of computing device capable of attaining access to a network to locate a service of interest on the network. Furthermore, the number of requesting clients may be greater or less than is shown. Moreover, the site repository 219 is illustrated as a database, but may be any other data repository capable of storing information used in embodiments of the invention as will be apparent from the teachings herein.

FIG. 3 and FIGS. 4A and 4B show the nearest endpoint locator in greater detail. As discussed above, the nearest endpoint locator is a software component that interfaces with data sources and performs calculations in order to identify the closest endpoint, with respect to network proximity, to a given requester. In an embodiment of the invention, the initial inputs taken by the nearest endpoint locator are an identity of the client and an identity of the requested service. FIG. 3 illustrates schematically the nearest endpoint locator 301 and its logical connectivity according to an embodiment of the invention. In particular, a requesting client 303 accesses the nearest endpoint locator 301 either directly or via a server, proxy, or other intermediary or intermediaries, and conveys to the endpoint locator 301 its identity and the identity of the service of interest. The nearest endpoint locator 301 accesses the site repository 305 and the service repository 307 to determine which endpoints provide the service of interest and to determine the endpoint having the closest network proximity to the requesting client 303. The information which the nearest endpoint locator 301 provides to the client will be discussed in greater detail with respect to FIGS. 5 and 6.

Although the foregoing example illustrates the nearest endpoint locator 301 as a separate entity, the nearest endpoint locator 301 is not restricted in location and may be located at any network entity accessible to the requesting client 303. FIGS. 4A and 4B illustrate other possible placements for the nearest endpoint locator 301 in further embodiments of the invention. In particular, as shown in FIG. 4A, the nearest endpoint locator 401 may reside as an application on the requesting client 403 itself. In this case, the nearest endpoint locator 401 accesses the site repository 405 and service repository 407 from the requesting client 403 using the network connections of the requesting client 403.

An alternative architecture usable in an embodiment of the invention is illustrated schematically in FIG. 4B. In the illustrated architecture, the nearest endpoint locator 411 is provided and exposed by the service repository 417. In this configuration, the requesting client 413 accesses the nearest endpoint locator 411 by connecting to the service repository 417. The nearest endpoint locator 411 thereafter uses the network connections of the service repository 417 to access the site repository 415 and uses information from both the service repository 417 and the site repository 415 to identify a nearest endpoint or endpoints as will be described in greater detail hereinafter with respect to FIG. 5. It will be appreciated that the architectures shown in FIGS. 3, 4A, and 4B are merely exemplary. For example, in an alternative embodiment of the invention, the site repository 305, the nearest endpoint locator 301, and the service repository 307 are all located on one machine, and in a further embodiment of the invention all are also part of the same service.

Referring now to FIG. 5, an exemplary procedure for facilitating location by a requesting client of a nearest endpoint according to an embodiment of the invention is set forth. In discussing the flow chart of FIG. 5, the data structures of FIGS. 6A-6B will be referenced as well for the convenience of the reader. While the flow chart of FIG. 5 assumes an architecture as shown in FIG. 3, it will be appreciated that the steps of the procedure may be easily modified by those of skill in the art, given the teachings herein, to accommodate any suitable architecture including the architectures shown in FIGS. 4A and 4B as well as others.

At step 501 of the procedure illustrated in FIG. 5, the requesting client 303 sends a request to the nearest endpoint locator 301 requesting an identification of endpoints providing a service of interest. As discussed above, the request preferably includes the identity of the requesting client 303 as well as the identity of the service of interest. In the request to the nearest endpoint locator 301, the network address of the requesting client 303 is usually apparent since the nearest endpoint locator 301 would generally need to know that information in order to send any information to the client 303. However, the requesting client 303 may be separated from the nearest endpoint locator 301 by a proxy such as an HTTP proxy server or otherwise. In this case, it is preferable that the request from the client 303 also explicitly identifies the network location of the requesting client 303.

Figure 6A:
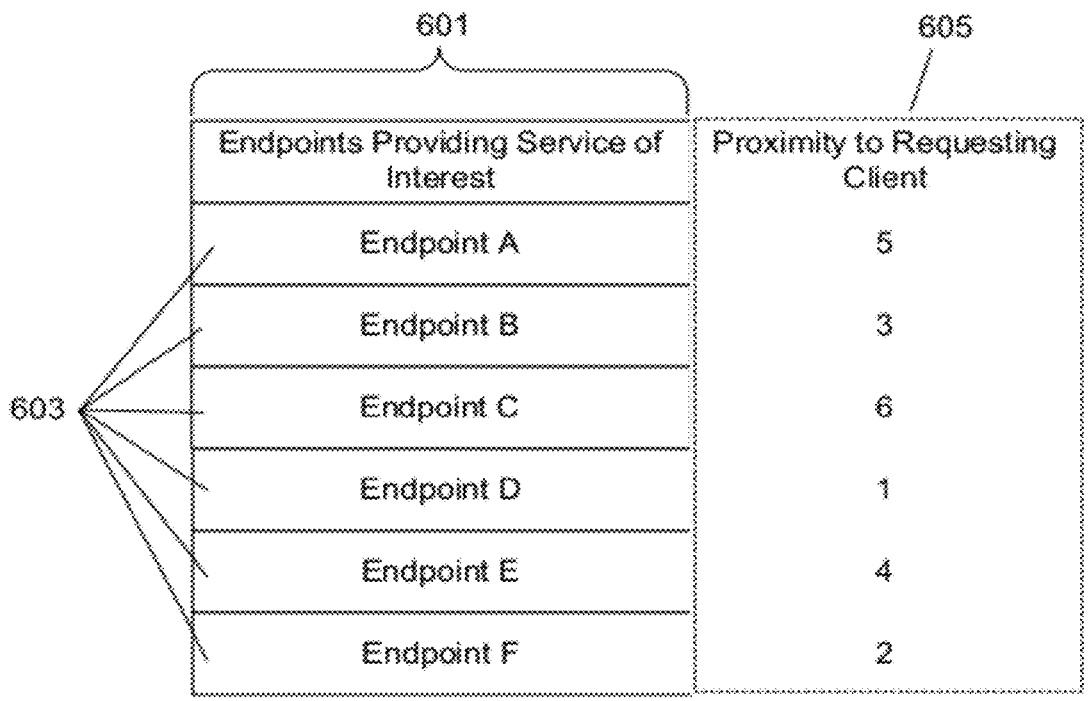
FIG. 6A is a schematic illustration of a data structure in accordance with an embodiment of the invention listing endpoints that provide a service of interest.

A number of mechanisms may be used to allow the client 303 to locate the appropriate nearest endpoint locator 301. In an embodiment of the invention, the client uses a nearest endpoint locator in the site in which it resides, or in a site designated by an administrator. At step 503, the nearest endpoint locator 301 contacts the service repository 307 with a request that identifies the service of interest and requests an enumeration of all endpoints that provide that service. In step 505, the service repository 307 responds to the nearest endpoint locator 301 with a list enumerating the endpoints that provide the service of interest. As used herein, an endpoint is said to provide the service of interest if the endpoint has been identified as hosting the service of interest regardless of whether the endpoint has ever actually provided the service of interest to a requesting client or otherwise. FIG. 6A illustrates schematically a data structure 601 corresponding to an enumeration of endpoints providing the service of interest as may be provided by the service repository 307. Each entry 603 in the enumeration identifies an endpoint. However, the endpoints are typically not in order of proximity to the requesting client 303. Example proximities are shown in dashed outline 605 for the convenience of the reader although such are not present in the data structure 601.

Subsequently at step 507, the nearest endpoint locator 301 determines the network location of each listed endpoint. In this connection, the list 601 provided by the service repository 307 preferably identifies for each listed endpoint 603 a network location and/or a network name of the endpoint 603. If only the network name is identified, then the nearest endpoint locator 301 preferably resolves the network name of each listed endpoint to an appropriate network location, such as via a DNS query to retrieve a network address for each such endpoint.

With respect to steps 501-507, in an alternative embodiment of the invention the requesting client 303 enumerates the endpoints that provide the service of interest. Thus, the request of the requesting client 303 to the nearest endpoint locator would include a list of such endpoints and a network location and/or a network name of the endpoint for each listed endpoint. If the list of endpoints from the requesting client 303 does not identify the network location of each endpoint, then the nearest endpoint locator 301 resolves the network name of each listed endpoint to an appropriate network location as discussed above. In an alternative embodiment of the invention, the requesting client 303 specifies a list only of endpoints in which the client 303 is interested, the listed endpoints being a subset of all endpoints providing the service of interest. In this case, the nearest endpoint locator would only return proximity data on the listed endpoints. This embodiment is particularly useful if the client 303 has an additional filtering mechanism and has already eliminated some possible endpoints. Moreover, the nearest endpoint locator 301 can return information saying why certain endpoints were or were not considered as suitable. For example, if a client requests four endpoints, the nearest endpoint locator 301 may return three in sorted order, as well as an indication that the fourth endpoint no longer is defined in the service repository 307. A requesting client 303 may also specify a time limit on the request to the nearest endpoint locator 301. Certain clients may be time sensitive, and the calculation of the nearest endpoint list may take a substantial amount of time in certain degenerate circumstances. The ability to specify an upper limit on the time to complete the request allows clients with hard deadlines to know how fast they can respond.

At step 509, the nearest endpoint locator 301 determines the network proximity of each endpoint to the requesting client 303. In an embodiment of the invention, this step is accomplished by sending a request to the site repository 305 for either the desired network proximity values or information from which the network proximities can be derived. In an embodiment of the invention, the information from which the network proximities can be derived comprises an identification of subnets, sites, subnet-to-site associations, and site-to-site connections. The identification of site-to-site connections may further comprise a "cost" value. The cost of using a replica can be ascertained by summing the costs of the site-to-site connections along the least cost site path between the client and the replica.

Next, the nearest endpoint locator sorts the endpoints that provide the service of interest in order of network proximity to the requesting client 303 at step 511. The list may be sorted in ascending or descending order. In the event that the respective proximities of two or more endpoints to the requesting client 303 are the same, the ordering of such endpoints may be executed either randomly or via additional criteria. For example, the endpoints having identical proximities may be ordered in the same order as they appeared in the enumeration prior to ordering, or they may be ordered using their respective IP addresses, etc. The ordering of endpoints having identical proximities is not critical, and they may be ordered in any suitable manner, including those mentioned above as well as any other.

In further embodiments of the invention, caching is used to speed the process of nearest endpoint identification. For example, in an embodiment of the invention the nearest endpoint locator 301 contacts endpoints and filters them out if they are not reachable or available. The resultant information may be cached to reduced response time when the nearest endpoint locator 301 is contacted by a requesting client. Other opportunities for caching are exploited as well in embodiments of the invention. For example, the location of the nearest endpoint locator could be cached by a requesting client. Moreover, the mapping of endpoints to network locations, and the mapping of network locations to proximities can be cached for higher performance as well.

According to further embodiments of the invention, recovery paths are provided in case one or more needed components should be unavailable. In particular, in the same manner that the requesting client 303 contacts subsequent endpoints until an available endpoint is found, other components may duplicated as well, with duplicates being tried on a nearest first basis in an embodiment of the invention. Duplicated components include, for example, the site repository 305, service repository 307, nearest endpoint locator 301, as well as any other component for which a failsafe is desired.

In the case of failure of a component such as the nearest endpoint locator 301, a duplicate component may be reached in any of a number of ways. In an embodiment of the invention, the contactor, such as the requesting client 303, elects to contact a particular replacement component. In an alternative embodiment of the invention, the replacement component selects and advertises itself as a replacement upon detecting that the primary component is unavailable. Note that the site repository 305 and service repository 307 provide services and may be replicated in the classic sense in the same manner as the service of interest is replicated.

Figure 6B:
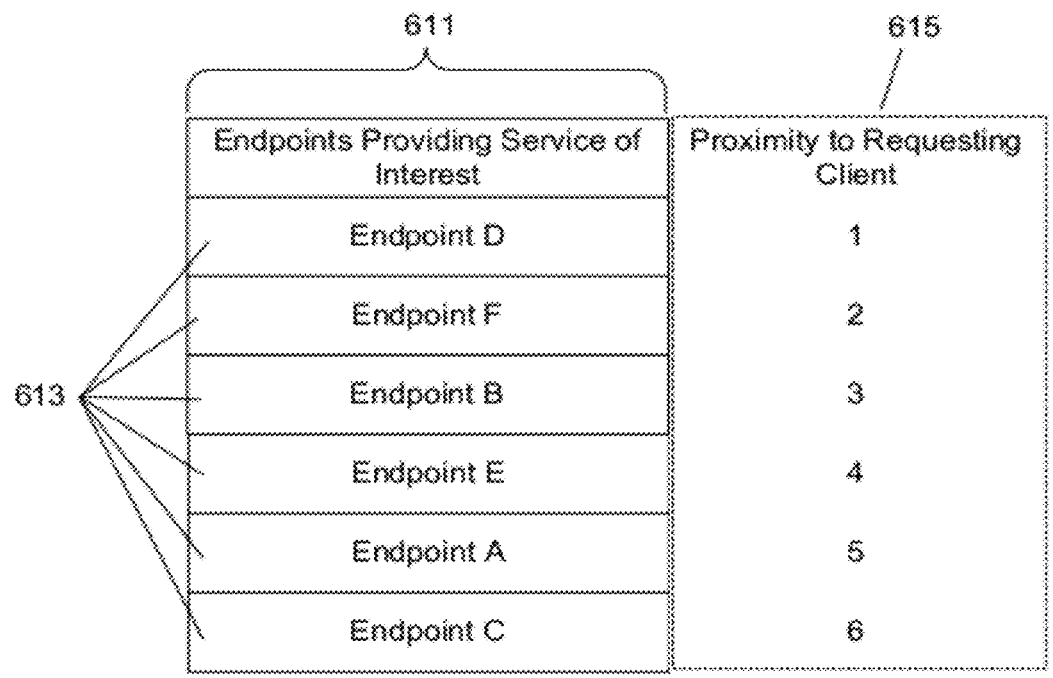
FIG. 6B is a schematic illustration of a data structure in accordance with an embodiment of the invention listing endpoints that provide a service of interest in order of their network proximity to a requesting client.

FIG. 6B illustrates schematically an exemplary sorted list 611, having the entries 613 arranged in order of proximity to the requesting client 303. The proximities are inherent in the data structure itself in an embodiment of the invention, and thus are not expressly listed. However, for the convenience of the reader, the proximities are listed within the dashed outline 615. In an alternative embodiment of the invention, the ordering of endpoints is done using a proximity field that identifies the relative proximity of each endpoint to the requesting client. In the latter embodiment, the endpoint proximities are not inherent in the physical order of entries. Instead, the ordering is apparent in the express proximity field. Herein, a listing is said to be ordered if the entries are physically ordered or alternatively if a field or other data accompanies the listing from which an ordering can be ascertained.

Figure 5B:
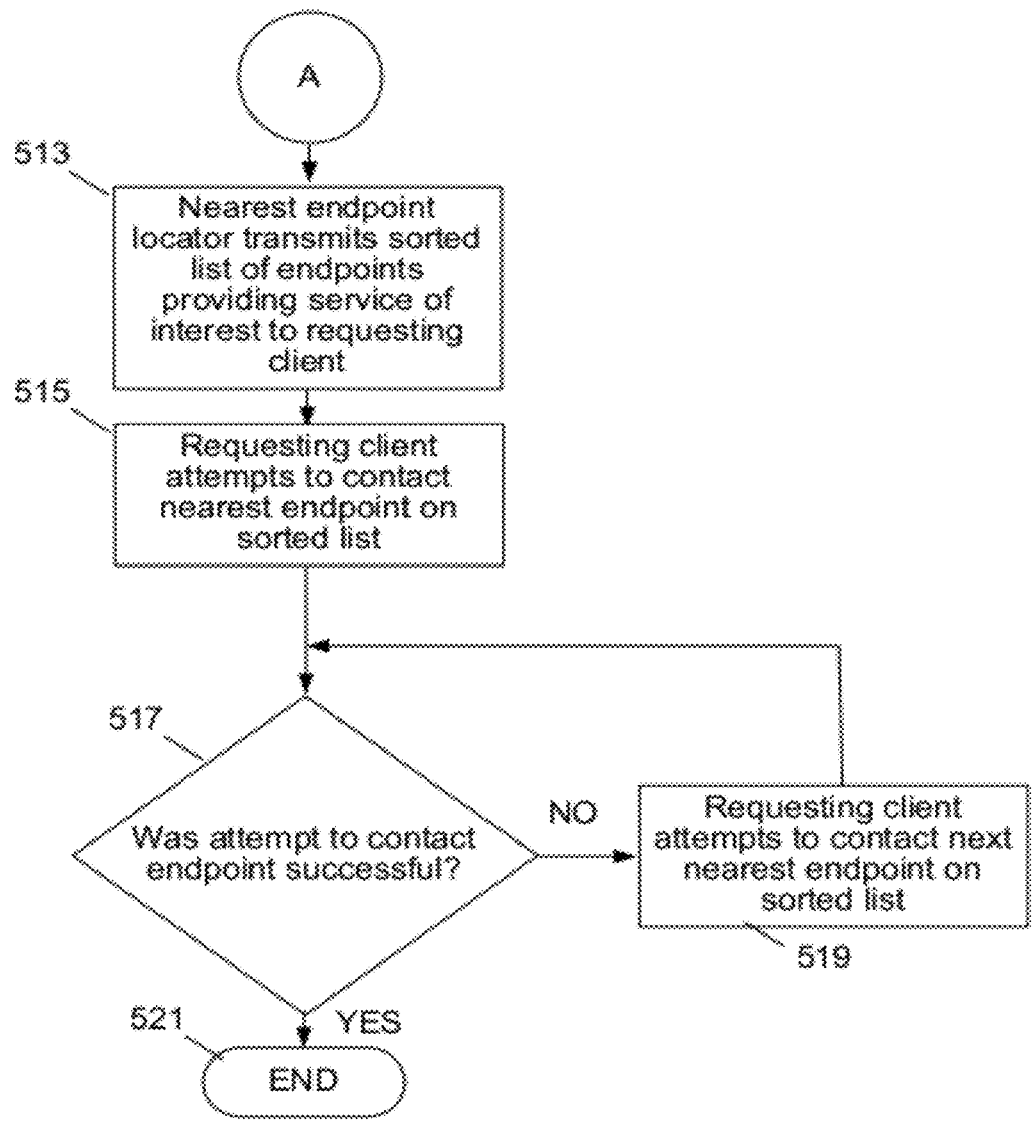
FIG. 5B is a flow chart illustrating further steps taken in accordance with an embodiment of the invention to facilitate service location based on network proximity of a providing endpoint to a requesting client.

At step 513, shown in FIG. 5B, the sorted list of endpoints providing the service of interest is provided to the requesting client 303. The sorted list of endpoints may be transmitted to the requesting client 303 in any suitable form, but in an embodiment of the invention the list is returned in sequential pages. Those of skill in the art will be familiar with the use of pages in the context of query results. The use of pages is especially beneficial when the sorted list is very large and the probability of a requesting client using information not on the first page is remote.

After receiving the sorted list of endpoints, the requesting client 303 can establish a connection with the closest available endpoint. In particular, at step 515, the requesting client 303 attempts to contact the nearest endpoint on the sorted list. If the list is in ascending order of proximity, then the first entry on the list identifies the nearest endpoint, whereas if the list is in descending order, then the last entry on the list identifies the nearest endpoint. In the event that each of a plurality of endpoints share the nearest proximity, then such endpoints will be adjacent in the list, and the step of contacting the nearest endpoint on the sorted list comprises contacting the first such endpoint on the list in the direction in which the requesting client 303 is processing the list.

If at step 517 it is determined that the attempt to contact the nearest endpoint on the sorted list was unsuccessful, e.g. a connection with the nearest endpoint on the sorted list could not be established, then at step 519 the requesting client 303 attempts to contact the next nearest endpoint on the sorted list. The process flows between steps 519 and 517 until a connection with an endpoint is successfully established. Once a connection to an endpoint is successfully established with respect to the first or a subsequent attempt, the process terminates at step 521.

It will be appreciated that an improved system and method for identifying service instances over a network based on network proximity have been described. In view of the many possible embodiments to which the principles of this invention may be applied, it should be recognized that the embodiments described herein with respect to the drawing figures are meant to be illustrative only and should not be taken as limiting the scope of invention. For example, those of skill in the art will recognize that some elements of the illustrated embodiments shown in software may be implemented in hardware and vice versa or that the illustrated embodiments can be modified in arrangement and detail without departing from the spirit of the invention. Therefore, the invention as described herein contemplates all such embodiments as may come within the scope of the following claims and equivalents thereof.

We claim:

1. A system for a requesting client to determine the closest available endpoint for accessing a service and for establishing a network connection from the requesting client to the endpoint in a computer network environment that includes a plurality of endpoints which provide the service and a nearest endpoint locator, the system comprising one or more computer processors and computer-readable storage having computer executable instructions, wherein, when the instructions are executed upon the one or more computer processors, the system performs a method comprising:

transmitting a request from the requesting client to the nearest endpoint locator, wherein the request identifies a service of interest desired by the requesting client;

receiving at the requesting client from the nearest endpoint locator an ordered enumeration of a plurality of endpoints, each of the plurality of endpoints in the received ordered enumeration providing the service of interest, the ordered enumeration of a plurality of endpoints comprising a data structure, the data structure comprising a plurality of fields, wherein for each endpoint in the plurality of endpoints, the plurality of fields includes a field comprising an identification of the each endpoint and includes an associated field comprising a value corresponding to a proximity to the client for the each endpoint, the nearest endpoint locator having ascertained the network location of the requesting client, the nearest endpoint locator having determined that each endpoint in the ordered enumeration provides the service of interest, the nearest endpoint locator having determined the network location of each of the endpoints in the ordered enumeration, the nearest endpoint locator having determined the network proximity to the requesting client of each endpoint in the ordered enumeration, and the nearest endpoint locator having sorted the endpoints in the ordered enumeration according to the network proximity of each endpoint in the ordered enumeration to the requesting client;

wherein the received ordered enumeration of the plurality of endpoints providing the service of interest comprises an enumeration of two equidistant endpoints having the same proximity to the requesting client, and wherein the ordering of the equidistant endpoints in the ordered enumeration of the plurality of endpoints is in accordance with an additional criterion, the additional criterion comprising the network address of each of the equidistant endpoints; and the requesting client establishing a network connection from the requesting client to an endpoint from the ordered enumeration.

2. The system according to claim 1 wherein establishing a network connection from the requesting client to an enumerated endpoint further comprises:

attempting to establish a network connection from the requesting client to a first enumerated endpoint in the ordered enumeration, the first enumerated endpoint having a proximity that is at least as close to the requesting client as any other enumerated endpoint in the ordered enumeration;

accessing the service of interest over a connection from the requesting client to the first enumerated endpoint if the attempt to establish a network connection from the requesting client to the first enumerated endpoint is successful; and when the attempt to establish a network connection from the requesting client to the first enumerated endpoint is not successful, attempting to establish a connection from the requesting client to a subsequent enumerated endpoint in the ordered enumeration, and accessing the service of interest over the connection from the requesting client to the subsequent enumerated endpoint if the attempt to establish a network connection from the requesting client to the subsequent enumerated endpoint is successful.

3. The system according to claim 1, wherein the request transmitted from the requesting client to the nearest endpoint locator comprises an enumeration of endpoints that provide the service of interest.

4. The system according to claim 1, wherein the request transmitted from the requesting client to the nearest endpoint locator omits an enumeration of endpoints that provide the service of interest.

5. The system according to claim 1 wherein the nearest endpoint locator is connected over a network connection to a service repository that hosts a listing of endpoints, wherein each endpoint is associated in the listing with a service that the endpoint provides.

6. A system of determining a closest available endpoint for a requesting client to access a service and of facilitating establishment of a network connection from the requesting client to a providing endpoint in a network environment that includes a plurality of endpoints which provide the service and a nearest endpoint locator, the system comprising one or more computer processors and computer-readable storage having computer executable instructions, wherein, when the instructions are executed upon the one or more computer processors, the system performs a method comprising:

receiving at the nearest endpoint locator a request from the requesting client, wherein the request identifies a service of interest to which the requesting client requires access;

the nearest endpoint locator ascertaining the network location of the requesting client;

the nearest endpoint locator determining that each of a plurality of endpoints provide the service of interest;

the nearest endpoint locator determining the network proximity of each of the plurality of endpoints to the requesting client;

the nearest endpoint locator sorting the plurality of endpoints according to the network proximity of each endpoint in the plurality of endpoints to the requesting client;

transmitting to the requesting client from the nearest endpoint locator an ordered enumeration of the plurality of endpoints, each endpoint in the ordered enumeration providing the service of interest, the ordered enumeration of the plurality of endpoints being ordered according to the network proximity of each endpoint in the ordered enumeration to the requesting client, the ordered enumeration of the plurality of endpoints providing the service of interest comprises an enumeration of two equidistant endpoints having the same proximity of the requesting client, and wherein the ordering of the equidistant endpoints in the ordered enumeration of the plurality of endpoints is in accordance with an additional criterion, wherein the additional criterion comprises the network address of each of the equidistant endpoints, and whereby the requesting client can establish a network connection to any of the endpoints within the ordered enumeration in order to access the service of interest.

7. The system according to claim 6, wherein the request received from the requesting client at the nearest endpoint locator comprises an enumeration of endpoints that provide the service of interest.

8. The system according to claim 6, wherein the request received from the requesting client at the nearest endpoint locator omits an enumeration of endpoints that provide the service of interest.

9. The system according to claim 6, further comprising:

sending a request from the nearest endpoint locator to a service repository that hosts a listing of endpoints, wherein each endpoint is associated in the listing with a service that the endpoint provides, and wherein the request identifies the service of interest; and receiving at the nearest endpoint locator from the service repository an enumeration of endpoints that provide the service of interest.

10. The system of claim 9, further comprising:

sending a request from the nearest endpoint locator to a site repository that hosts information regarding at least the respective proximity of the requesting client to each of the endpoints providing the service of interest;

receiving at the nearest endpoint locator location information derived from the information regarding at least the respective proximity of the requesting client to each of the endpoints providing the service of interest; and ordering the enumeration of endpoints that provide the service of interest according substantially to the network proximity of each such endpoint to the requesting client to create the ordered enumeration of the plurality of endpoints.

* * * * *